(12) United States Patent
Chen et al.

(10) Patent No.: US 12,200,553 B2
(45) Date of Patent: Jan. 14, 2025

(54) TARGET CELL ID FOR CONDITIONAL HANDOVER AND CONDITIONAL PSCell ADDITION OR CHANGE

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Gerhard Kilian Eichiner, Munich (DE); Haijing Hu, Los Gatos, CA (US); Naveen Kumar R. Palle Venkata, San Diego, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 17/593,468

(22) PCT Filed: Oct. 22, 2020

(86) PCT No.: PCT/CN2020/122826
§ 371 (c)(1),
(2) Date: Sep. 19, 2021

(87) PCT Pub. No.: WO2022/082600
PCT Pub. Date: Apr. 28, 2022

(65) Prior Publication Data
US 2022/0303853 A1    Sep. 22, 2022

(51) Int. Cl.
*H04W 36/00*   (2009.01)
*H04W 36/36*   (2009.01)

(52) U.S. Cl.
CPC . *H04W 36/0085* (2018.08); *H04W 36/00835* (2018.08); *H04W 36/362* (2023.05)

(58) Field of Classification Search
CPC . H04W 36/24; H04W 36/0085; H04W 36/08; H04W 36/36; H04W 36/00835;
(Continued)

(56) References Cited

U.S. PATENT DOCUMENTS

| 2014/0126545 A1* | 5/2014 | Tamura | H04W 36/0069 370/332 |
|---|---|---|---|
| 2019/0223057 A1 | 7/2019 | Park et al. | |

(Continued)

FOREIGN PATENT DOCUMENTS

| CN | 104853386 | 8/2015 |
|---|---|---|
| CN | 106535271 | 3/2017 |

(Continued)

*Primary Examiner* — Dady Chery
(74) *Attorney, Agent, or Firm* — Fay Kaplun & Marcin, LLP

(57) ABSTRACT

A user equipment (UE) may be configured with information to perform conditional handovers or addition/change of a primary secondary cell (PSCell). The UE receives a first radio resource control (RRC) configuration message from the source cell for conditional handover to the at least one target cell, the first RRC configuration message including conditional handover execution conditions, an RRC configuration and a target cell ID for each one of a list of target cells, performs measurements on the target cells to determine whether any one of the target cells fulfills its corresponding conditional handover execution conditions and, when a first target cell from the list of target cells fulfills its corresponding conditional handover execution conditions, initiates a handover to the first target cell.

17 Claims, 6 Drawing Sheets

(58) Field of Classification Search
CPC ............. H04W 36/04; H04W 36/0058; H04W 36/0061; H04W 36/0077; H04W 36/0079; H04W 36/305
See application file for complete search history.

(56) References Cited

U.S. PATENT DOCUMENTS

| | | |
|---|---|---|
| 2019/0223073 A1 | 7/2019 | Chen et al. |
| 2019/0246323 A1* | 8/2019 | Kim .................... H04W 36/305 |
| 2023/0180083 A1 | 6/2023 | Shi et al. |

FOREIGN PATENT DOCUMENTS

| | | |
|---|---|---|
| CN | 110493830 | 11/2019 |
| CN | 110612741 | 12/2019 |
| CN | 111615216 | 9/2020 |
| CN | 113170365 | 7/2021 |
| WO | 2020/090440 | 5/2020 |
| WO | 2020/119621 | 6/2020 |
| WO | 2020/132427 | 6/2020 |

* cited by examiner

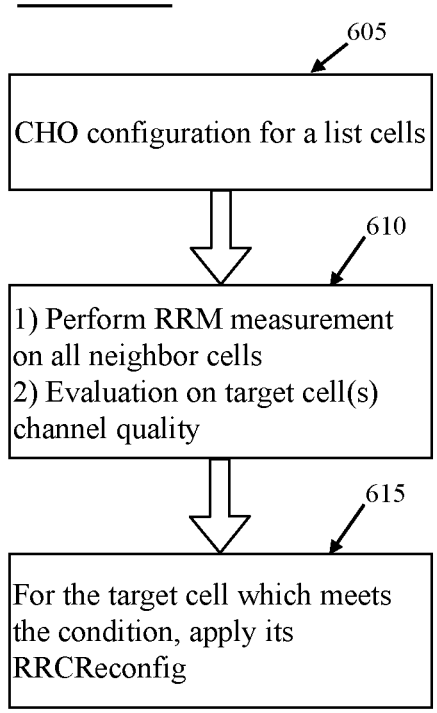
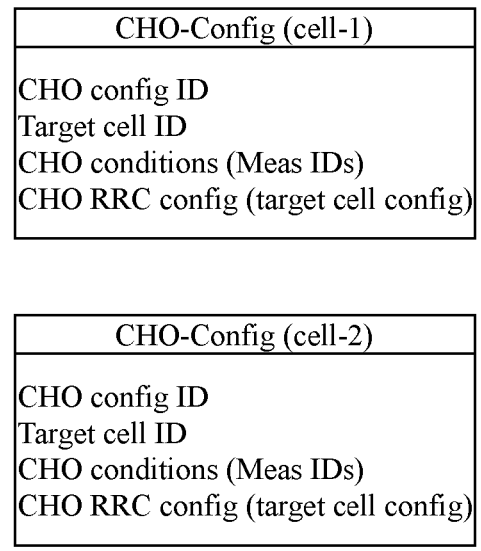
Fig. 6
Fig. 7
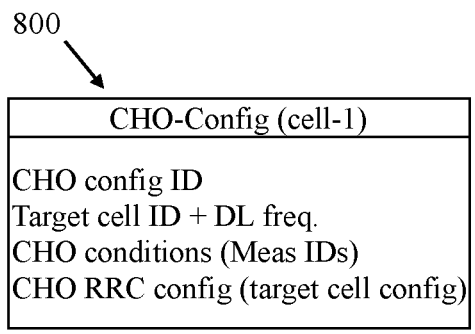
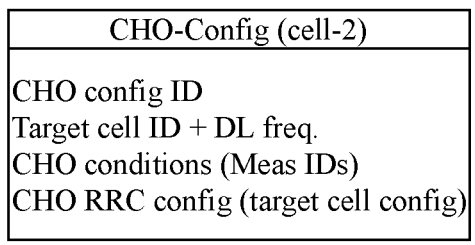
Fig. 8

TARGET CELL ID FOR CONDITIONAL HANDOVER AND CONDITIONAL PSCell ADDITION OR CHANGE

BACKGROUND INFORMATION

Conditional handover (CHO) relates to an operation in which a network provides to a user equipment (UE) a list of target cell(s) for CHO with a corresponding radio resource control (RRC) configuration, which are prepared for handover to the UE in advance of the actual handover. For each target cell, the source gNB provides at least one condition for the UE to perform CHO. The condition(s) may relate to a radio quality for the target cell, as determined by the UE. The UE performs measurements on the target cells and, when the condition is satisfied for a target cell, the UE starts CHO and applies the preconfigured target cell configuration immediately. With CHO, the UE is able to perform handover without the involvement of the source cell, e.g. even when a radio quality of the connection with the source cell has degraded such that a source cell-initiated handover is not possible. Conditional primary secondary cell (PSCell) addition/change (CPAC) relates to a similar operation in which a list of target PSCell(s) is provided to the UE, along with corresponding condition(s) for handover, and the UE initiates handover when the condition is satisfied for one of the target PSCells.

For each target cell provided to the UE in either of the exemplary operations (CHO or CPAC), the UE parses the RRC configuration to acquire the physical cell ID(s) of the target cell(s). The processing burden associated with the RRC configuration parsing may be high, considering the number of target cells provided may be high and most of the target cells will not be used for the handover.

SUMMARY

Some exemplary embodiments are related to a user equipment (UE) having a transceiver configured to communicate with a source cell and at least one target cell and a processor communicatively coupled to the transceiver and configured to perform operations. The operations include receiving a first radio resource control (RRC) configuration message from the source cell for conditional handover to the at least one target cell, the first RRC configuration message including conditional handover execution conditions, an RRC configuration and a target cell ID for each one of a list of target cells, performing measurements on the target cells to determine whether any one of the target cells fulfills its corresponding conditional handover execution conditions and, when a first target cell from the list of target cells fulfills its corresponding conditional handover execution conditions, initiating a handover to the first target cell.

Other exemplary embodiments are related to a processor of a user equipment (UE) configured to perform operations. The operations include receiving a first radio resource control (RRC) configuration message from a source cell for conditional handover to at least one target cell, the first RRC configuration message including conditional handover execution conditions, an RRC configuration and a target cell ID for each one of a list of target cells, performing measurements on the target cells to determine whether any one of the target cells fulfills its corresponding conditional handover execution conditions and, when a first target cell from the list of target cells fulfills its corresponding conditional handover execution conditions, initiating a handover to the first target cell.

Still further exemplary embodiments are related to a base station serving as a source cell for a user equipment (UE). The base station includes a transceiver configured to communicate with the UE and at least one target cell and a processor communicatively coupled to the transceiver and configured to perform operations. The operations include sending a conditional handover request to the at least one target cell and receiving a conditional handover response including a radio resource control (RRC) configuration for the at least one target cell, transmitting a first RRC configuration message for conditional handover to the UE, the first RRC configuration message including conditional handover execution conditions, the RRC configuration and a target cell ID for each one of a list of target cells, wherein the UE performs measurements on the target cells to determine whether any one of the target cells fulfills its corresponding conditional handover execution conditions and, when a first target cell from the list of target cells fulfills its corresponding conditional handover execution conditions, the UE initiates a handover to the first target cell.

BRIEF DESCRIPTION OF THE DRAWINGS

FIG. 6 shows a method for CHO or CPAC according to various exemplary embodiments.

FIG. 7 shows a CHO-config information element (IE) according to various exemplary embodiments.

FIG. 8 shows a CHO-config information element (IE) according to various exemplary embodiments.

DETAILED DESCRIPTION

Figure 1:
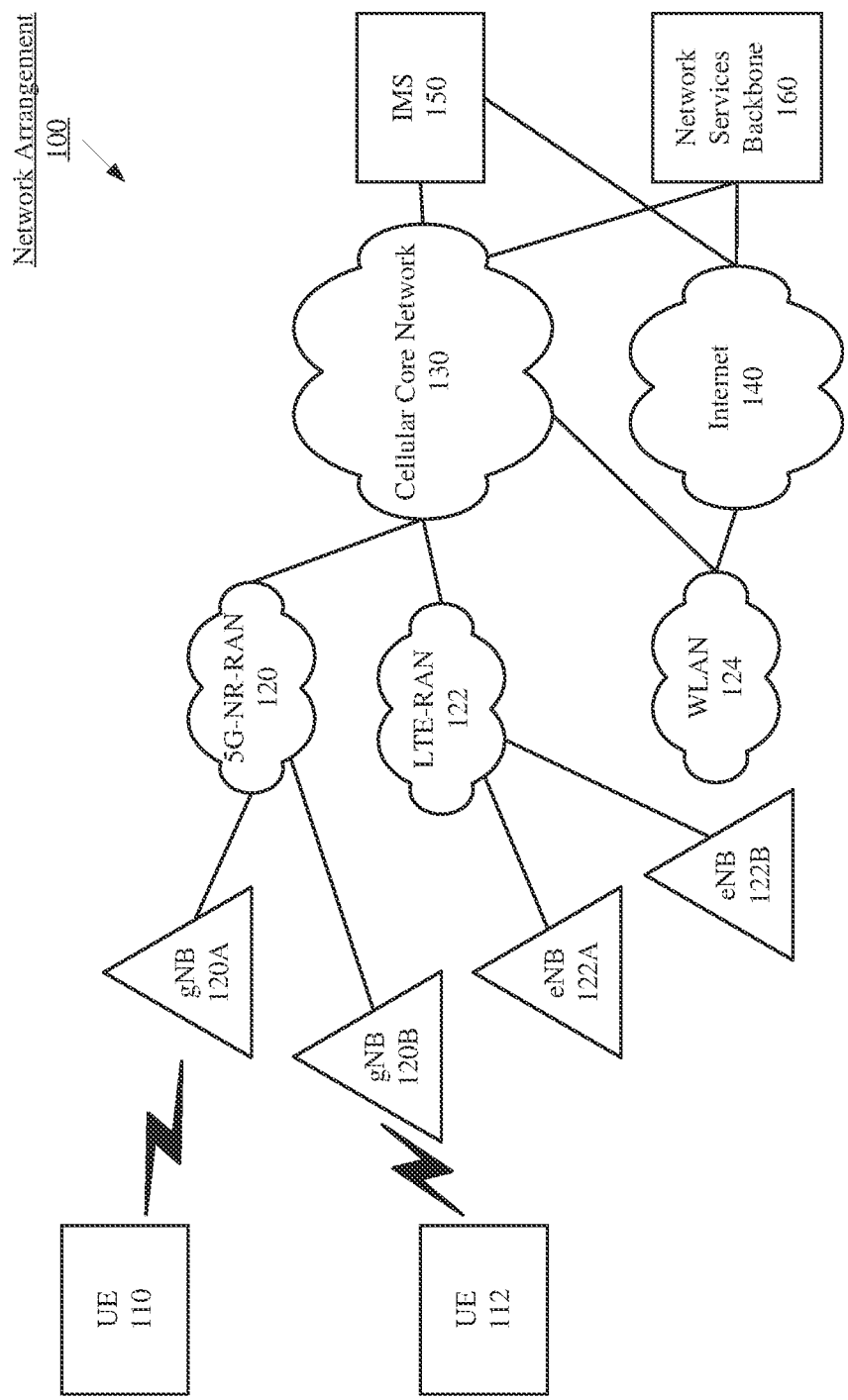
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to operations for performing conditional handover (CHO) or conditional primary secondary cell (PSCell) addition/change (CPAC) for a user equipment (UE). In the exemplary operations, the UE is provided a target cell ID for each of the target cells for handover in a source configuration received from a source cell. The UE is not required to parse radio resource control (RRC) configuration data for the target cell(s), thus reducing a UE processing burden. In some embodiments, a downlink (DL) frequency is also provided to the UE for each of the target cells.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

The exemplary embodiments described herein relate to handover, in which a UE transitions from a connection on a first cell to a connection on a second cell. In some embodiments, the handover is performed between gNBs, e.g. handover from gNB 120A to gNB 120B (inter-node handover), while in other embodiments the handover is performed between co-located cells at a single gNB, e.g. gNB 120A (intra-node handover).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
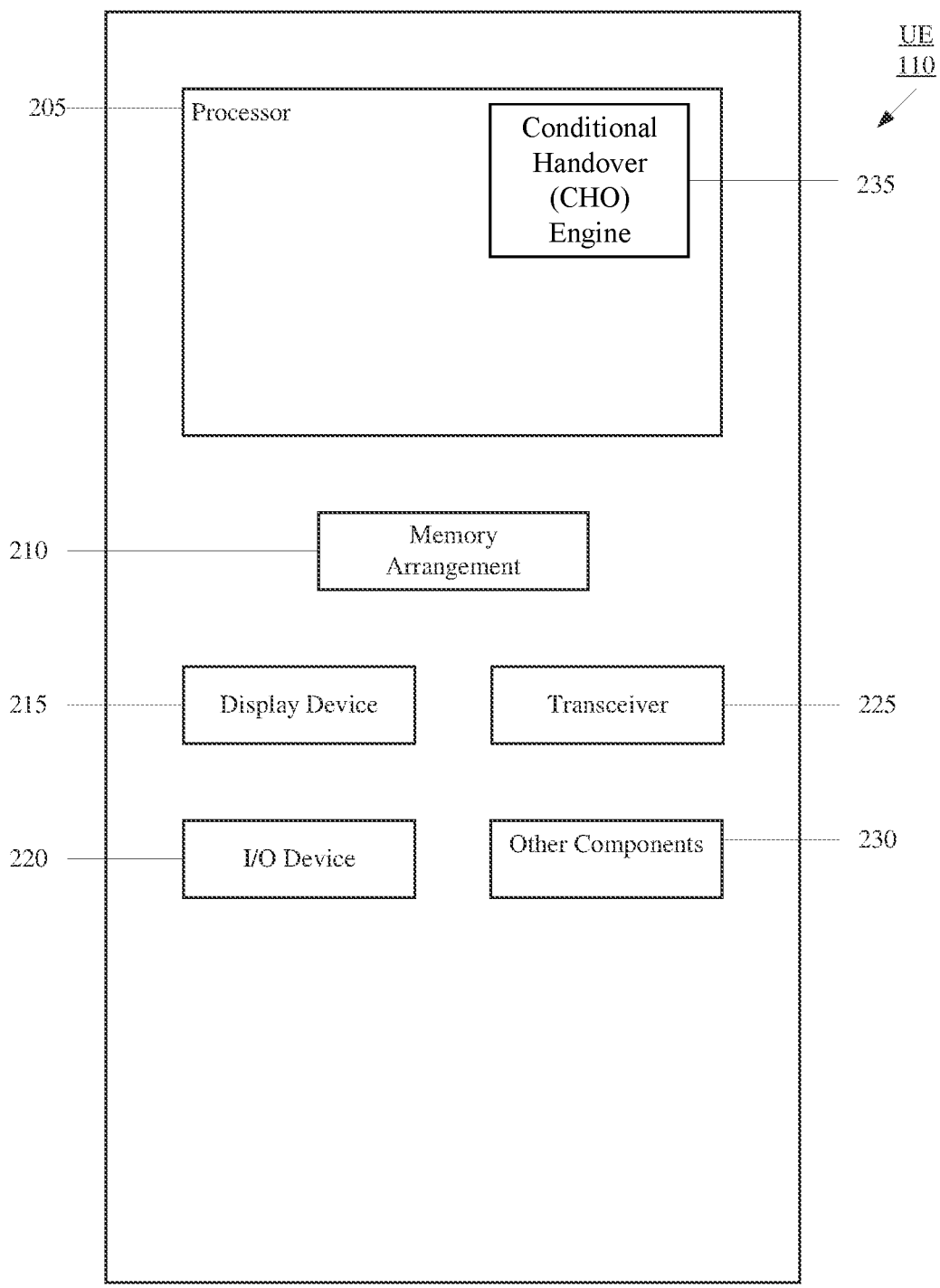
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a conditional handover (CHO) engine 235 for performing operations including receiving a CHO command from a network cell and initiating handover when radio quality conditions for a target cell are satisfied. The operations may further include determining a physical cell ID for one or more target cells based on a radio resource control (RRC) configuration message received from the network cell, to be described in detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
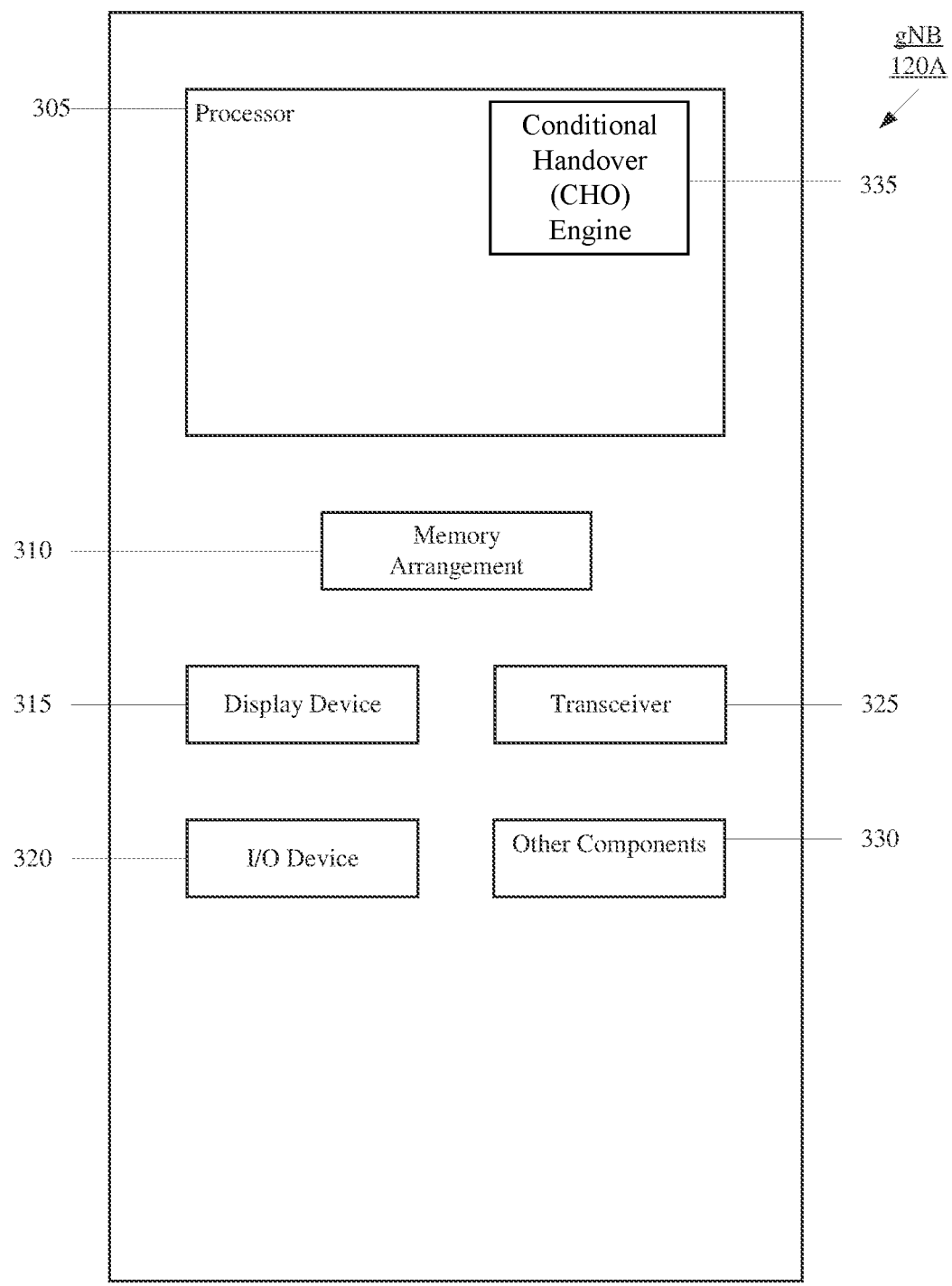
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a conditional handover (CHO) engine 335 for performing operations including transmitting a CHO command to a UE so that the UE initiates handover when radio quality conditions for a target cell are satisfied, as determined by the UE. The operations may further include indicating a physical cell ID for one or more target cells in a radio resource control (RRC) configuration message transmitted to the UE, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Conditional handover (CHO) was introduced in Rel-16 to improve handover (HO) reliability. The CHO operation includes the network providing a list of target cell(s) for CHO with a corresponding RRC configuration, which are prepared for handover to the UE in advance of the actual handover. For each target cell, the source gNB provides a condition for the UE to perform CHO. The condition may relate to a radio quality for the target cell, as determined by the UE. The UE performs measurements on the target cells and, when the condition is satisfied for a target cell, the UE starts CHO and applies the preconfigured target cell configuration immediately. With CHO, the UE is able to perform a handover without the involvement of the source cell, e.g., even when a radio quality of the connection with the source cell has degraded such that a source cell-initiated handover is not possible.

Figure 4:
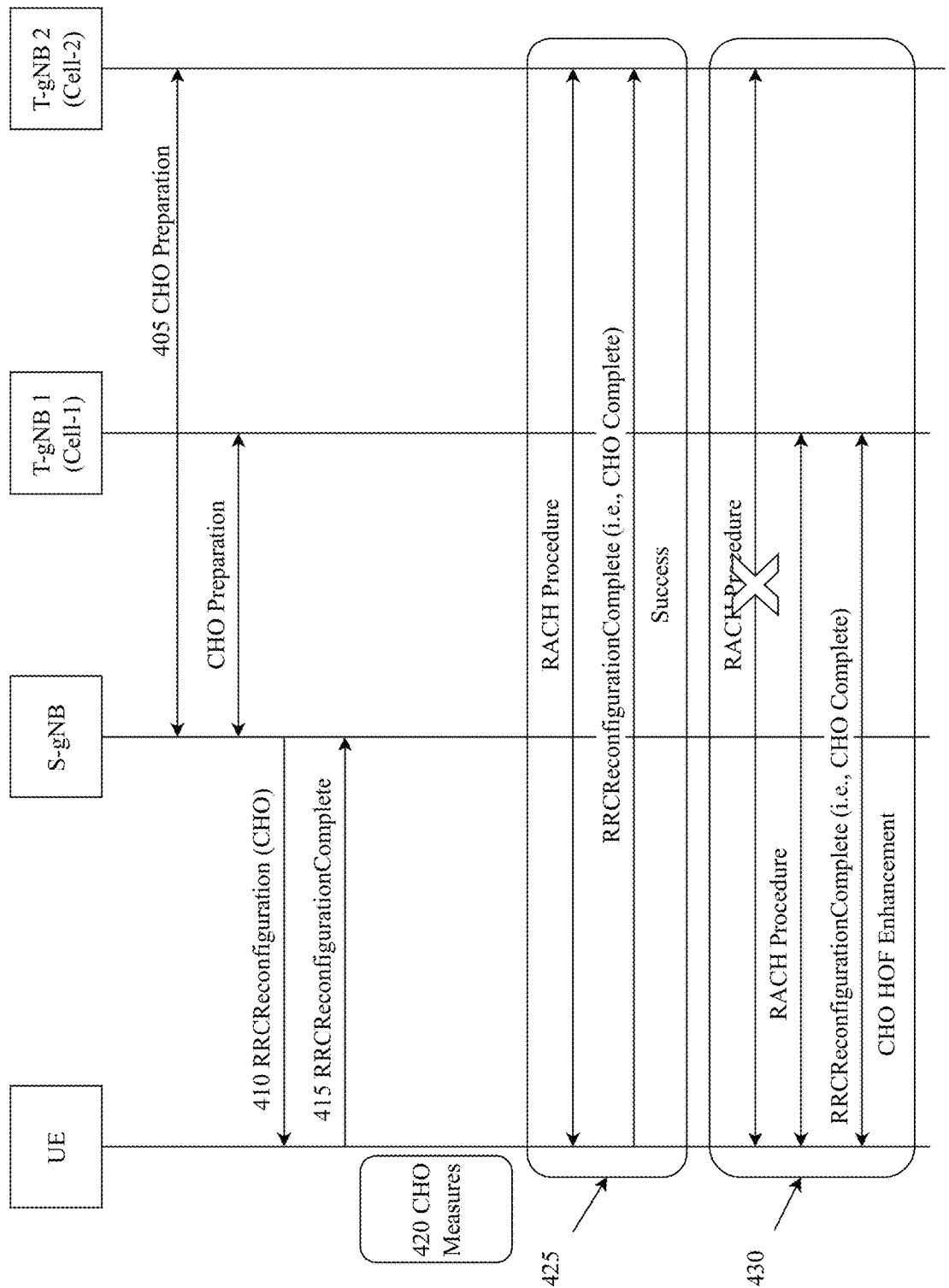
FIG. 4 shows a signaling diagram for conditional handover (CHO) according to various exemplary embodiments.

FIG. 4 shows a signaling diagram 400 for conditional handover (CHO). The signaling diagram 400 relates to the existing specifications for CHO. In the exemplary signaling diagram 400, two target cells (a first target cell (T-gNB 1) and a second target cell (T-gNB 2) are shown as potential HO candidates for a UE. However, any number of target cells may be configured as potential HO candidates. The signaling diagram 400 further includes a source cell (S-gNB) initiating the CHO operation.

In 405, the source gNB prepares one or more target gNBs for conditional handover (CHO). The target gNB preparation may include the source gNB sending a CHO request to the one or more target gNBs and receiving a CHO response (e.g. a HO request acknowledgement) including a configuration for the CHO candidate cells. A CHO response may be sent for each candidate cell including configuration data for the candidate cell.

In 410, the source gNB sends an RRCReconfiguration message to the UE including a CHO configuration for each of the target cells prepared by the source gNB. The CHO configuration may include CHO execution conditions that may include one or more trigger conditions for CHO events, e.g. reference signal received power (RSRP), reference signal received quality (RSRQ) or signal-to-interference plus noise ratio (SINR) quantities for evaluating the quality of the radio link.

In 415, upon receiving the RRCReconfiguration message, the UE decodes the source configuration and CHO conditions and stores the CHO RRC configuration for each target cell. When the UE has successfully processed the CHO RRC configurations, the UE sends an RRCReconfigurationComplete message to the source gNB. The UE processing may include parsing each of the CHO RRC configurations to extract a physical cell ID for each of the target cells.

In 420, the UE performs measurements on the target cell(s) for determining whether a target cell fulfills the CHO conditions for the cell. In the exemplary signaling diagram 400, the UE determines the CHO condition is fulfilled for the second target gNB.

In 425, the UE performs handover for the target cell that has fulfilled the CHO condition, i.e., the second target cell. The handover operation includes a random access (RACH) procedure with the second target cell and, when the CHO is complete, the UE sends an RRCReconfigurationComplete message to the second target cell.

430 shows an alternate process for when the RACH procedure fails with handover target cell, e.g., handover failure (HOF) or radio link failure (RLF) handling. In this scenario, the UE performs cell selection and determines a suitable cell for CHO. If a suitable cell is not found for CHO, the UE selects to another cell and performs legacy RRC re-establishment.

In conditional PSCell addition/change (CPAC), the UE performs a similar operation as described above for CHO. In CPAC, the secondary node (SN) may provide a list of target cell(s) for conditional PSCell change, which are prepared for PSCell change for the UE. For each target cell, the SN provides a condition for the UE to perform PSCell change. The UE performs measurements on the target cell(s) and, when the condition satisfies, the UE initiates PSCell change and applies the target cell configuration immediately.

Figure 5:
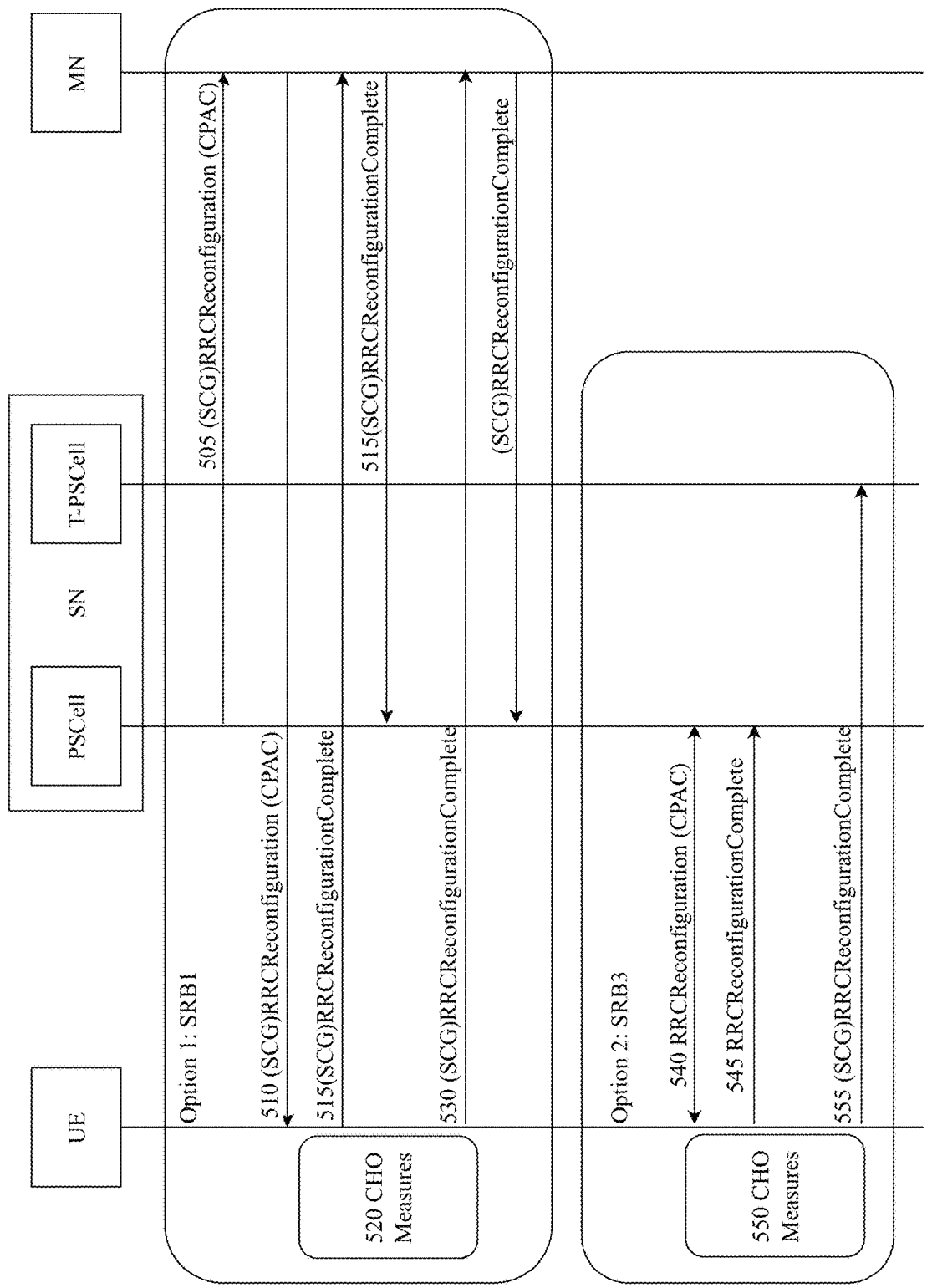
FIG. 5 shows a signaling diagram for conditional PSCell addition/change (CPAC) according to various exemplary embodiments.

FIG. 5 shows a signaling diagram 500 for conditional PSCell addition/change (CPAC). The signaling diagram 500 relates to the existing specifications for CPAC and includes two options to be discussed below. The first option relates to a master node (MN) implementing the PSCell change, while the second option relates to intra-SN CPAC and does not include the MN. In the exemplary signaling diagram 500, one target cell (a target PSCell (T-PSCell)) is shown as a potential CPAC candidate on a secondary node (SN) for the UE. However, any number of target cells may be configured as potential CPAC candidates.

For the first option, in 505, the secondary node (SN) for a UE sends an RRCReconfiguration message for a secondary cell group (SCG) to a master node (MN) for the UE. The RRCReconfiguration message may include a list with configurations of the CPAC candidate cells for CHO.

In 510, the MN sends an RRCReconfiguration message to the UE including a CHO configuration for each of the target PSCells. Similar to the method 400, the CHO configuration for each target PSCell includes a CHO configuration ID, CHO execution conditions (measurement IDs), and a CHO RRC configuration (target cell configuration). The CHO execution conditions may include one or more trigger conditions for CHO events, e.g. RSRP, RSRQ or SINR quantities for evaluating the quality of the radio link.

In 515, upon receiving the RRCReconfiguration message, the UE decodes the source configuration and CHO conditions and stores the CHO RRC configuration for each target PSCell. When the UE has successfully processed the CHO RRC configurations, the UE sends an RRCReconfiguration-Complete message to the MN. In 520, the MN informs the SN of the successful RRCReconfiguration of the UE.

In 525, the UE performs measurements on the target PSCell(s) for determining whether a target PSCell fulfills the CHO conditions for the cell. In the exemplary signaling diagram 500, the UE determines the CHO condition is fulfilled for the T-PSCell.

In 530, the UE performs handover for the PSCell that has fulfilled the CHO condition, e.g. the T-PSCell. When the CHO is complete, the UE sends an RRCReconfiguration-Complete message to the MN. In 535, the MN informs the PSCell of the successful CPAC operation.

For the second option, in 540, the SN sends an RRCReconfiguration message to the UE including a CHO configuration for each of the target PSCells. Similar to the method 400, the CHO configuration for each target PSCell includes a CHO configuration ID, CHO execution conditions (measurement IDs), and a CHO RRC configuration (target cell configuration). The CHO execution conditions may include one or more trigger conditions for CHO events, e.g. RSRP, RSRP or SINR quantities for evaluating the quality of the radio link.

In 545, upon receiving the RRCReconfiguration message, the UE decodes the source configuration and CHO conditions and stores the CHO RRC configuration for each target PSCell. In 550, the UE performs measurements on the target PSCell(s) for determining whether a target PSCell fulfills the CHO conditions for the cell. In the exemplary signaling diagram 500, the UE determines the CHO condition is fulfilled for the T-PSCell.

In 555, the UE performs handover for the PSCell that has fulfilled the CHO condition, i.e. the T-PSCell. When the CHO is complete, the UE sends an RRCReconfiguration-Complete message to the T-PSCell.

FIG. 6 shows a method 600 for CHO or CPAC according to various exemplary embodiments. The method 600 may be applied for either of the conditional handover scenarios described above (CHO or CPAC).

In 605, the UE receives a CHO configuration for a list of target cells from a source cell. According to various exemplary embodiments, the CHO configuration that is received by the UE, from the source cell in 605, includes an identification of the target cell. As described above, current procedures require the UE to parse the RRCReconfiguration messages to extract a physical cell ID for each of the target cells. In the exemplary embodiments, the physical cell ID of the target cell is included in the CHO configuration, thereby eliminating the need for the UE to parse the RRCReconfiguration messages. Various examples of including the physical cell ID of the target cell in the CHO configuration are described below.

According to some exemplary embodiments, the CHO configuration for the target cell(s) (provided to the UE by the source cell) includes a target cell ID for each of the target cells. FIG. 7 shows a CHO-config information element (IE) 700 according to various exemplary embodiments described herein. In the example of FIG. 7, it may be considered that there are two cells on the list. Thus, FIG. 7 includes a CHO-config IE 700 for both cells in the list. The CHO-config IE 700, for each of the cells, includes the CHO config ID, the CHO conditions (meas IDs), the CHO RRC config, and the target cell ID.

In these embodiments, the UE can determine the target physical cell ID (PhysCellID) directly from reading the source configuration, without parsing the target cell RRCreconfiguration. When the UE performs the target cell check, the UE uses the PhysCellId together with the frequency indicated by the measurement object (e.g. MeasID) to identify if the cell being checked is the cell indicated by the target RRCReconfiguration. Thus, the UE is not required to parse the target cell RRCReconfiguration.

According to other exemplary embodiments, the CHO configuration for the target cell(s) may include a target cell ID and a downlink (DL) frequency (ssbFrequency) for each of the target cells. FIG. 8 shows a CHO-config information element (IE) 800 according to various exemplary embodiments described herein. In the example of FIG. 8, it may again be considered that there are two cells on the list. Thus, FIG. 8 includes a CHO-config IE 800 for both cells in the list. The CHO-config IE 800, for each of the cells, includes the CHO config ID, the CHO conditions, the CHO RRC config, the target cell ID and the DL frequency.

In these embodiments, the UE can determine the target physical cell ID and the DL frequency directly from reading the source configuration, without parsing the target cell RRCreconfiguration, similar to the embodiment discussed above, or the CHO conditions (meas IDs). When the UE performs the target cell check, the UE may use the PhysCellId together with the frequency (indicated by ssbFrequency) to identify if the cell being checked is the cell indicated by the target RRCReconfiguration.

In still further exemplary embodiments, the CHO configuration for the target cell(s) (provided to the UE by the source cell) may include a target cell ID and a DL frequency for each of the target cells in a measurement object (MeasObject) IE. The MeasObject IE corresponds to the CHO conditions discussed above with respect to the CHO configuration.

In this embodiment, the UE can determine the target physical cell ID (PhysCellID) and DL frequency from the MeasObject IE, without parsing the target cell RRCreconfiguration. If multiple CHO cells are configured in the measurement object, a rule may be implemented to map the cell ID in this configuration with the cell index in CondReconfigToAddModList.

In 610, the UE performs radio resource management (RRM) measurement on the received list of cells. After performing the measurements for the target cell IDs for the list of target cells, the UE evaluates the channel quality of the target cell(s). In 615, when a target cell meets its CHO condition(s), the UE applies the RRCReconfig for that cell.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A user equipment (UE), comprising:
   a transceiver configured to communicate with a source cell and at least one target cell; and
   a processor communicatively coupled to the transceiver and configured to perform operations comprising:
   receiving a first radio resource control (RRC) configuration message from the source cell for conditional handover comprising a conditional handover information element (IE), the conditional handover IE including conditional handover execution conditions, a conditional handover RRC configuration and a target cell ID for each one of a list of target cells, wherein the conditional handover is an intra-node handover performed between co-located cells of a single next generation node B (gNB);
   performing measurements on the target cells to determine whether any one of the target cells fulfills its corresponding conditional handover execution conditions; and
   when a first target cell from the list of target cells fulfills its corresponding conditional handover execution conditions, initiating a handover to the first target cell.

2. The UE of claim 1, wherein the UE receives the target cell ID for each of the target cells directly from the conditional handover IE and does not parse RRCReconfiguration messages for each of the target cells to determine the corresponding target cell IDs.

3. The UE of claim 2, wherein the conditional handover IE further includes a downlink frequency in a measurement object for each of the target cells.

4. The UE of claim 2, wherein the UE receives a downlink frequency for each of the target cells directly from the conditional handover IE and does not parse a measurement object for each of the target cells to determine the corresponding downlink frequency.

5. The UE of claim 1, wherein the conditional handover IE further includes a downlink frequency and the target cell ID in a measurement object for each of the target cells and the UE does not parse the RRC configurations for each of the target cells to determine the corresponding target cell IDs.

6. The UE of claim 5, wherein the operations further comprise:
   when multiple target cells are configured in a single measurement object, mapping a cell ID from the single measurement object to a cell index list to determine the corresponding target cell ID.

7. A processor of a user equipment (UE) configured to perform operations comprising:
   receiving a first radio resource control (RRC) configuration message from a source cell for conditional handover comprising a conditional handover information element (IE), the conditional handover IE including conditional handover execution conditions, a conditional handover RRC configuration and a target cell ID for each one of a list of target cells, wherein the conditional handover is an intra-node handover performed between co-located cells of a single next generation node B (gNB);
   performing measurements on the target cells to determine whether any one of the target cells fulfills its corresponding conditional handover execution conditions; and
   when a first target cell from the list of target cells fulfills its corresponding conditional handover execution conditions, initiating a handover to the first target cell.

8. The processor of claim 7, wherein the target cell ID for each of the target cells is received directly from the conditional handover IE and the processor does not parse the RRC configurations for each of the target cells to determine the corresponding target cell IDs.

9. The processor of claim 8, wherein the conditional handover IE further includes a downlink frequency in a measurement object for each of the target cells.

10. The processor of claim 8, wherein a downlink frequency for each of the target cells is received directly from the conditional handover IE and the processor does not parse a measurement object for each of the target cells to determine the corresponding downlink frequencies.

11. The processor of claim 7, wherein the conditional handover IE further includes a downlink frequency and the target cell ID in a measurement object for each of the target cells and the processor does not parse the RRC configurations for each of the target cells to determine the corresponding target cell IDs.

12. A base station serving as a source cell for a user equipment (UE), comprising:
    a transceiver configured to communicate with the UE and at least one target cell; and
    a processor communicatively coupled to the transceiver and configured to perform operations comprising:
    sending a conditional handover request to the at least one target cell and receiving a conditional handover response including a radio resource control (RRC) configuration for the at least one target cell, wherein the conditional handover is an intra-node handover performed between co-located cells of a single next generation node B (gNB);
    transmitting a first RRC configuration message for conditional handover to the UE, the first RRC configuration message including a conditional handover IE comprising conditional handover execution conditions, the RRC configuration and a target cell ID for each one of a list of target cells,
    wherein the UE performs measurements on the target cells to determine whether any one of the target cells fulfills its corresponding conditional handover execution conditions and, when a first target cell from the list of target cells fulfills its corresponding conditional handover execution conditions, the UE initiates a handover to the first target cell.

13. The base station of claim 12, wherein the target cell ID for each of the target cells is included directly in the conditional handover IE so that the UE does not parse the RRC configurations for each of the target cells to determine the corresponding target cell IDs.

14. The base station of claim 13, wherein the conditional handover IE further includes a downlink frequency in a measurement object for each of the target cells.

15. The base station of claim 13, wherein a downlink frequency for each of the target cells is included directly in the conditional handover IE so that the UE does not parse a measurement object for each of the target cells to determine the corresponding downlink frequencies.

16. The base station of claim 12, wherein the conditional handover IE further includes a downlink frequency and the target cell ID in a measurement object for each of the target cells so that the UE does not parse the RRC configurations for each of the target cells to determine the corresponding target cell IDs.

17. The base station of claim 12, wherein the source cell is located at a first next generation node B (gNB) and the at least one target cell is located at a second gNB, the source cell serving as a primary secondary cell (PSCell) and the at least one target cell serving as a target PSCell.

\* \* \* \* \*